United States Patent [19]

Ogawa et al.

[11] 4,324,471
[45] Apr. 13, 1982

[54] ELECTROMAGNETIC DRIVE DEVICE FOR CAMERA

[75] Inventors: Yukio Ogawa, Kawasaki; Michio Hirohata, Inagi, both of Japan

[73] Assignee: Canon Kabushiki Kaisha, Tokyo, Japan

[21] Appl. No.: 141,280

[22] Filed: Apr. 18, 1980

[30] Foreign Application Priority Data

Apr. 28, 1979 [JP]  Japan .............................. 54-57163[U]

[51] Int. Cl.³ .............................................. G03B 9/22
[52] U.S. Cl. .................................................. 354/234
[58] Field of Search ................. 354/50, 51, 60 R, 133, 354/234, 235, 250, 258, 271, 274, 228-232

[56] References Cited

U.S. PATENT DOCUMENTS 3,987,473  10/1976  Kondo ................................. 354/234

FOREIGN PATENT DOCUMENTS 54-5425  1/1979  Japan .

*Primary Examiner*—L. T. Hix
*Assistant Examiner*—William B. Perkey
*Attorney, Agent, or Firm*—Toren, McGeady & Stanger

[57] ABSTRACT

An electromagnetic drive device is described for use in a camera to electromagnetically drive the diaphragm or shutter blades. A conductive coil pattern is positioned on the opposite sides of a rotor for the shutter drive. The shutter blades, which are driven by the rotor, are made of a synthetic resin. In order to connect the rotor to the shutter blades, electrically conductive drive pins are used to electrically couple the coil pattern on one side of the above-described rotor to the pattern on the opposite rotor side. The axle of the drive pin, moreover, is fixed in a penetration hole in the rotor.

3 Claims, 8 Drawing Figures

ELECTROMAGNETIC DRIVE DEVICE FOR CAMERA

BACKGROUND OF THE INVENTION

1. Field of the Invention

This invention relates to cameras and, more particularly, to an electromagnetic drive device for controlling the diaphragm or camera shutter aperture opening.

2. Description of the Prior Art

It is known to provide an electromagnetic drive device for use in a camera in which the rotor for driving the diaphragm, or shutter blades, is formed from a synthetic resin and electrically conductive coil patterns are provided on the rotor. Thus, when the coil patterns are supplied with current and are subjected to the influence of a magnetic field from a permanent magnet disposed opposite to the coil pattern, the rotor responds by producing a force according to Fleming's left hand law, that controls the operation of the diaphragm or shutter blades. This force for driving the shutter blades may be expressed by the equation $F = B \cdot I \cdot L$, in which the force F is directly proportional to each of the strengths of the magnetic flux, by the intensity of current in the coil, I, and the coil length L.

In order to generate a suitable force in these circumstances, it is necessary to make the coil as long as possible. This requirement is usually fulfilled by providing coil patterns on the both sides of the rotor. In this case, the coil patterns on the both of the sides must be electrically coupled to each other.

To electrically connect patterns on the both of the rotor surfaces, according to the prior art, a hole through the wall of the rotor is provided, and either solder is poured into the hole, or an electrical conductor is inserted and seated in the hole with both of the conductor ends soldered.

In order to assemble the electromagnetic drive device, therefore, the rotor formed in the foregoing manner, is positioned between two permanent magnets that establish a magnetic circuit. The rotor, moreover, is affixed to the drive axles of the shutter blades by caulking means. The rotary shafts of the shutter blades also are affixed by caulking means to a common substrate that supports the permanent magnets. The shutter blades are then disposed between this substrate and the permanent magnets upon driving the rotor to an open position.

For this reason, the process of manufacturing conventional electromagnetic drive devices imposes a need for the time-consuming and troublesome steps of pouring the solder into the hole to establish an electrical connection between the coil patterns on the opposite surface of the rotor, or fitting an additional electrical conductor in the hole and soldering it to the coil patterns.

An object of the present invention is to eliminate all the above-described conventional drawbacks.

It is a further object of the invention to provide a rotor for driving the shutter blades which move with respective drive axles that are made from an electrically conductive metal so that with the drive axles mounted in the fixture, the coil pattern on one surface of the rotor is also automatically electrically connected to the coil pattern on the opposite rotor surface.

Another object of the present invention is to make the blades from a synthetic resin so that the drive axles and rotary shafts are integrally formed, while at least one of the drive axles is excluded from the integral forming process and is provided through the substitution of an electrically conductive metal that establishes an electrical connection for both of the coil patterns on the opposite surfaces of the blade driving rotor.

DESCRIPTION OF PREFERRED EMBODIMENTS

Figure 1:
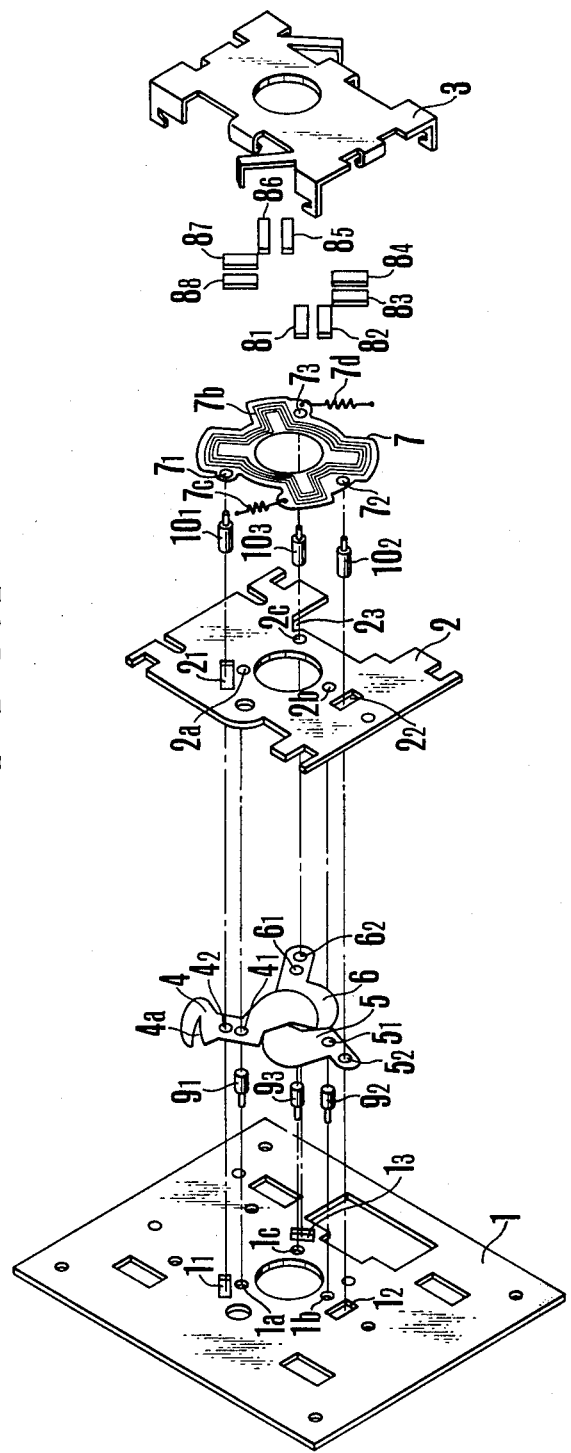
FIG. 1 is an exploded perspective view of one embodiment of an electromagnetic drive device for a camera according to the present invention.
Figure 2:
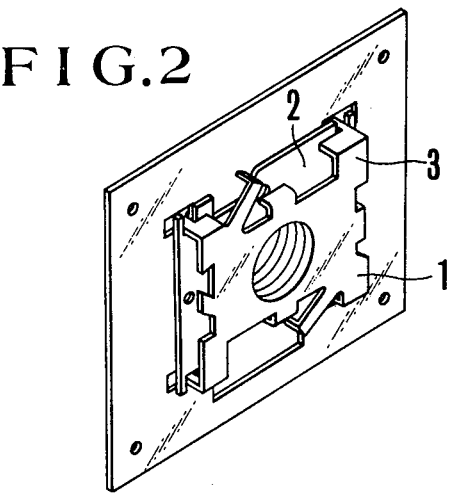
FIG. 2 is an assembled perspective view of the device of FIG. 1.
Figure 3:
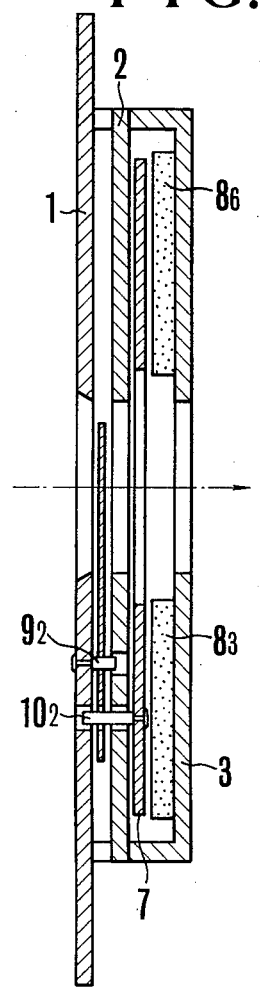
FIG. 3 is a lateral sectional view of the device of FIG. 2.

One embodiment of the present invention is described with reference to the drawings. FIGS. 1 to 3 shown an electromagnetic drive device for controlling the motion of diaphragm-built-in shutter blades. In FIG. 2, for convenience of explanation, only one blade is illustrated, the other blades being omitted to simplify the drawing. FIGS. 1 to 3 show a base plate 1 and first and second magnetic plates 2 and 3 that form a magnetic circuit. Shutter blades 4, 5, 6 which also serve as diaphragm blades and which are made of an opaque thermoplastic resin or thermosetting resin are electrically non-conductive. Of these three blades 4, 5 and 6, one blade 4 is provided with an auxiliary diaphragm aperture 4a.

A sector ring 7 is the rotor for driving the blades 4, 5, 6. The ring 7 is made of an insulating material such as a non-magnetic glass-epoxy or plastic. On the opposite plane surfaces of this sector ring 7, electrically conductive coil patterns 7a and 7b are etched. Further, in this respect, the sector ring 7 is also provided with return springs 7c and 7d.

Four pairs of permanent magnets $8_1$, and $8_2$, $8_3$ and $8_4$, $8_5$ and $8_6$, $8_7$ and $8_8$, are magnetized in the direction of the thickness of the plates 2, 3, and are oriented so that the polarities of the two magnets in each of the four pairs are opposite each other.

Rotary shafts $9_1$, $9_2$, $9_3$ are each fixed at one of their ends in respective holes 1a, 1b and 1c of the base plate by caulking. The opposite ends of the rotary shafts $9_1$, $9_2$, $9_3$ extend through holes $4_1$, $5_1$ and $6_1$ of the respective shutter blades 4, 5, and 6 in order to be received in holes 2a, 2b and 2c of the first magnetic plate 2 in order to mount the shutter blades 4, 5 and 6 for rotation about the shafts $9_1$, $9_2$ and $9_3$.

Drive axles $10_1$, $10_2$, $10_3$ for the shutter blades 4, 5 and 6, respectively, are formed of an electrically conductive metal. One end of each of the drive axles $10_1$, $10_2$, $10_3$ are fixed in respective holes $7_1$, $7_2$ and $7_3$ of the sector ring 7 by high-spin caulking means. The opposite ends of the drive axles $10_1$, $10_2$, $10_3$ extend through elongated slots $2_1$ and $2_2$ and a cutout $2_3$ respectively, in the first magnetic plate 2. The drive axles $10_1$, $10_2$, $10_3$ also extend through respective holes $4_2$, $5_2$ and $6_2$ of the shutter blades 4, 5, and 6 and enter elongated slots $1_1$, $1_2$ and $1_3$ in the base plate 1. In this manner, the shutter blades 4, 5 and 6 are driven to move by the drive axles $10_1$, $10_2$ and $10_3$ in response to operation of the sector ring 7. Of these three drive axles $10_1$, $10_2$ and $10_3$, the drive axle $10_2$ is selected to serve as a means for electrically coupling the coil pattern $7a$ on one surface of the sector ring 7 with the coil pattern $7b$ on the opposite surface thereof.

Figure 4:
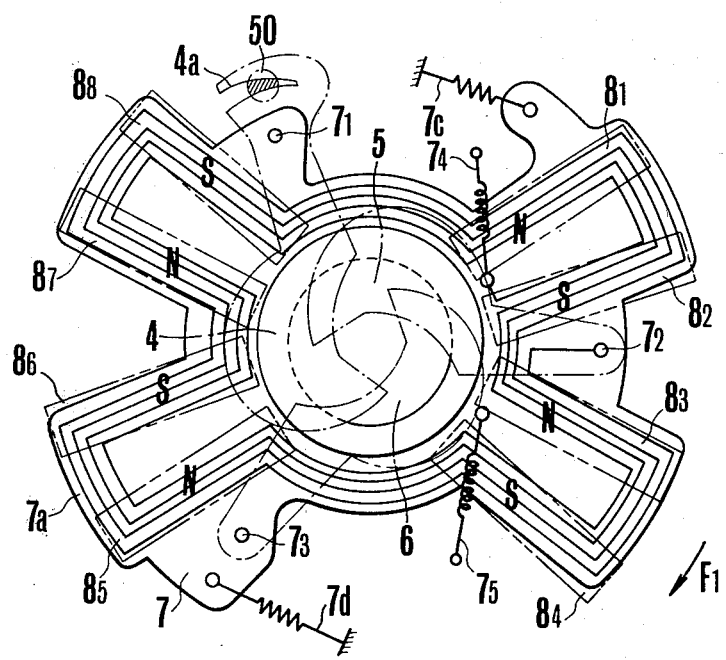
FIG. 4 is a plan view of a sector ring as the rotor shown in FIGS. 1 and 3.
Figure 5:
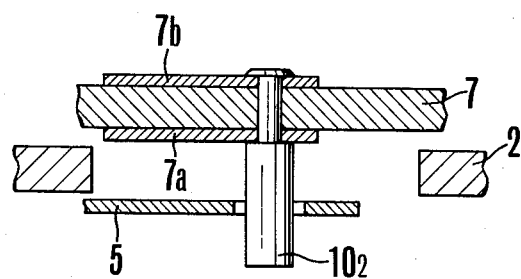
FIG. 5 is a fragmentary sectional view showing the details of the main parts of the device shown in FIGS. 1 and 3.
Figure 6:
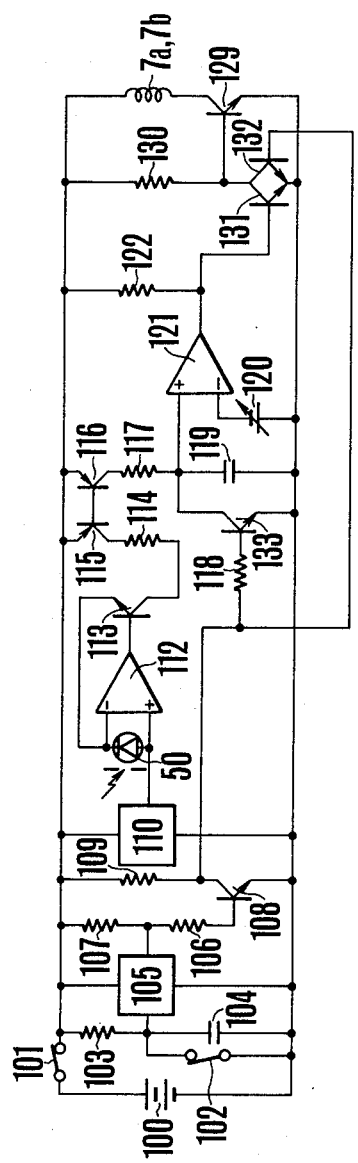
FIG. 6 is an electrical circuit diagram of the device shown in FIGS. 1 to 3.

The construction and arrangement of this electrical connection means is shown in FIGS. 4 and 5. In FIG. 4, dot and dash lines indicate the position of the shutter blades 4, 5 and 6, and double-dots and single dash lines indicate the position of the permanent magnet pairs $8_1$ and $8_2$, ..., $8_7$ and $8_8$, in relation to the sector ring 7. In FIG. 4, $7_4$ is a lead wire from one end of the coil pattern $7a$; $7_5$ is a lead wire from one end of the coil pattern $7b$. These lead wires $7_4$ and $7_5$ are connected to an electromagnetic drive circuit that is shown in FIG. 6.

The opposite end of the coil pattern $7a$ is adjacent to a bore $7_2$, and the opposite end of the coil pattern $7b$ also is adjacent to a bore $7_2$. Therefore, it is made possible by inserting the drive axle $10_2$ into the bore $7_2$ to electrically connect the coil patterns $7a$ and $7b$ on opposite surfaces of the sector ring because the drive axle $10_2$ is made of an electrically conductive metal. With the high spin caulking technique to fix the drive axle $10_2$ to the sector ring 7, as shown in FIG. 5, electrical conduction between the coil pattern $7a$ on one surface of the sector ring 7 and the coil pattern $7b$ on the opposite surface is improved.

The shape of the drive axle $10_2$ in this illustrative example is shown in FIG. 5. That is, the end of the drive axle $10_2$ that is inserted into the bore $7_2$ is narrowed or stepped down to enable the contact area between the drive axle $10_2$ and the coil patterns $7a$ and $7b$ to increase and thus reduce electrical resistance.

Note that in FIG. 4, a photo-sensitive element 50 is shown.

Here we must note that the process for assembling the above-described electromagnetic drive device comprises the steps of:

bringing the rotary shafts $9_1$, $9_2$ and $9_3$ into caulking engagement in the respective holes $1a$, $1b$ and $1c$ of the base plate 1, inserting the drive axles $10_1$, $10_2$ and $10_3$ into the holes $7_1$, $7_2$ and $7_3$ of the sector ring 7, fixing the drive axles $10_1$, $10_2$ and $10_3$ to the sector ring 7 by the high spin caulking technique to enable the coil patterns $7a$ and $7b$ on opposite sides of the sector ring 7 to be electrically connected to each other through the electrically conductive drive axle $10_2$, interposing the sector ring 7 in the space between the first and second magnetic plates 2 and 3 with the pairs of permanent magnets $8_1$ and $8_2$, ..., $8_7$ and $8_8$ forming a magnetic circuit, the drive axles $10_1$, $10_2$ and $10_3$ that are secured to the sector ring 7 are inserted into the slots $2_1$ and $2_2$ and the cutout $2_3$, inserting the rotary shafts $9_1$, $9_2$ and $9_3$ that are fixed to the base plate 1 into the holes $2a$, $2b$ and $2c$ of the first magnetic plate 2 by way of the holes $4_1$, $5_1$ and $6_1$ of the shutter blades 4, 5 and 6, arranging the shutter blades 4, 5 and 6 to lie in a space between the base plate 1 and the first magnetic plate 2, inserting the drive axles $10_1$, $10_2$ and $10_3$ into the holes $1_1$, $1_2$ and $1_3$ of the base plate 1 by way of the holes $4_2$, $5_2$ and $6_2$ of the shutter blades 4, 5 and 6, and securing the first magnetic plate 2 and the second magnetic plate 3 to the base plate 1.

The operation of the above-described electromagnetic drive device is next described. When a release is actuated, the drive circuit of FIG. 6 is energized with a current that flows in a direction from the lead wire $7_5$ (not shown in FIG. 6), to the lead $7_4$ (also not shown in FIG. 6) through the coil patterns $7b$ and $7a$ on the sector ring 7. Because the pairs of permanent magnets $8_1$ and $8_2$, ..., $8_7$ and $8_8$ establish magnetic fields in accordance with Fleming's left hand law, the sector ring 7 exerts a force in the direction F1 as viewed in FIG. 4. This force causes the sector ring 7 to bear against the forces of the return springs $7c$ and $7d$. The motion of the sector ring 7 is transmitted through the drive axles $10_1$, $10_2$ and $10_3$ to the shutter blades 4, 5 and 6, thereby opening the shutter.

As the size of the shutter opening increases, the size of the aperture opening of the auxiliary diaphragm $4a$ (FIG. 4) also increases. When the amount of light integrated by the photo-sensitive element 50 reaches a predetermined level, the drive circuit current is cut off. Therefore, the electromagnetic force in the direction F1 no longer is available causing the sector ring 7 to move under the influence of the springs $7c$ and $7d$ in the reverse, closing the shutter again.

FIG. 6 shows a control circuit for the abovedescribed electromagnetic drive device. In the figure, an electrical power source or battery 100 is connected to a normally open main switch 101 that closes if a release button (not shown) is depressed to the first stroke. A normally closed release switch 102 is arranged to open either if the release button (not shown) is depressed from the first to the second stroke, or if automatic focusing of the auto-focus camera is completed.

A resistor 103 and a capacitor 104 constitute a timing circuit. A timer circuit 105 prevents chattering when a release is actuated. The control circuit also has a constant voltage supply 110, and a photo-sensitive element 50 for light measurement, in this instance, in the form of an SPC. This SPC is connected across the two input terminals of an operational amplifier 112. A switching transistor 133 also is provided for short-circuiting both terminals of a capacitor 119. The collector electrode of the transistor 133, moreover, is connected to the non-inversion input of a comparator 121. The inversion input of the comparator 121, however, is connected to the output of a variable voltage source 120 which is calibrated to reflect the sensitivity in ASA of the film (not shown) that is to be exposed. Switching transistors 131 and 132 are provided for controlling the operation of a transistor 129 which controls the ON and OFF operation of the pattern coils $7a$ and $7b$ (FIG. 4).

The operation of this circuit is next described. The operator will first close the main switch 101. Because the release switch 102 is in the closed position, the output of the timer circuit 105 is at a low level, and the transistor 108 remains in a non-conducting mode, i.e., in the OFF position. Therefore, the transistor 133 is turned on to set the non-inversion input of the comparator 121 at a voltage of almost zero volts with production of an output of L level from the comparator 121. The non-conducting status of the transistor 108 also causes the switching transistor 132 to conduct or turn on and therefore the transistor 129 is turned off so that no current is supplied to the pattern coils 7a and 7b as yet, and the shutter blades do not move.

Then, when a shutter release is actuated to open the release switch 102, the timing condenser 104 begins charging through the resistor 103. In a predetermined time, depending upon the timing circuit, the timer circuit 105 changes its output from the low to a high level, thus turning on the transistor 108. As a consequence of the activation of the transistor 108, the transistors 132 and 133 are turned off. To this point in the circuit operation, the output of the comparator 121 is maintained at a low level and the transistor 131 remains in the nonconducting, OFF status. In this manner, the transistor 129 is turned on so that the pattern coils 7a and 7b are supplied with current, thus enabling the shutter to start to open.

At the same time, the auxiliary diaphragm 4a (FIG. 4) starts to open and admit light passing therethrough to impinge on the photo-sensitive element 50. In these circumstances, a current with an intensity that is proportional to the object brightness flows to the capacitor 119. When the voltage across the capacitor 119 reaches a predetermined level, depending upon the sensitivity of the film that is being exposed, the output of the comparator 121 is inverted from the low to the high level. This causes the switching transistor 131 to turn on, which, in turn, causes the transistor 129 to turn off. In this manner, the current to the pattern coils 7a, 7b is cut off.

Figure 7:
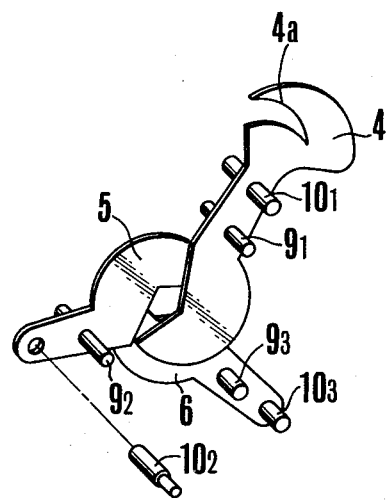
FIG. 7 is a perspective view of another embodiment of the invention with integrally formed shutter blades and axles.

In the above-described embodiment of the invention, the drive axles $10_1$, $10_2$ and $10_3$ and rotary shafts $9_1$, $9_2$ and $9_3$ are described as individual structural parts. The rotary shafts $9_1$, $9_2$ and $9_3$, however, may be formed as an integral unit with either the base plate 1, or the shutter blades 4, 5 and 6. The drive axles $10_1$, $10_2$ and $10_3$ also may be integrally formed with either the shutter blades 4 and 6, or with the rotor 7. FIG. 7 shows an example of an integral construction of each of the shutter blades 4, 5 and 6 with respect to the rotary shafts $9_1$, $9_2$ and $9_3$ and drive axles $10_1$, $10_2$ and $10_3$.

It should be noted that in order to electrically connect the coil patterns 7a and 7b of the sector ring 7 to each other, the drive axle $10_2$ is not an integrally formed member. This drive axle $10_2$ alone is formed from an electrically conductive metal. Moreover, in order to improve the electrical conductivity between the coil patterns 7a and 7b, the high spin caulking technique is employed to secure the drive axle $10_2$ to the rotor 7.

Figure 8:
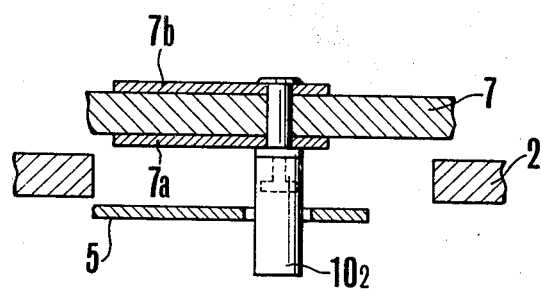
FIG. 8 is a view similar to that shown in FIG. 5, but of another example of the invention.

Another example of the drive axle $10_2$ is shown in FIG. 8. In this embodiment of the invention, the end portions that contribute to electrical contact is made from electrically conductive metal, while the rest of the axle is formed from the same material as that of the other members. In this circumstance, the rotor, shutter blades, shafts and most of the other moving parts can be formed from a synthetic resin. In this case, in order to improve sturdiness and stability, it is desirable to give the electrically conductive part the configuration that is shown by the dashed lines, thereby reinforcing the intimate contact of the electrically conductive portion with the synthetic resin portion of the drive axle $10_2$.

As has been described in detail, according to the present invention, as the drive axles that connect the blades with the rotor in order to drive the blades are made of an electrically conductive material, when the drive axles are secured to the rotor, a portion of the drive axles automatically establishes an electrical connection between the coil pattern on one surface of the rotor and the coil pattern on the opposite surface. In this manner, the troublesome step of electrically connecting the coil patterns of both surfaces of the rotor to each other that would be otherwise necessary, as in the prior art, is omitted.

Further, because the blades are made of synthetic resin, the weight of the blades is significantly reduced with the advantage that the electromagnetic force is more effectively used. Moreover, the rotary shafts and drive axles of the blades may be formed integrally, as single units. In this circumstance, drive devices can be manufactured economically. Further, the use of the synthetic resin in the moving parts greatly reduces the possibility of faulty operation and large differences in thermal expansion coefficients are eliminated.

According to another feature of the present invention, only one drive axle is provided independently of the other members which are formed as an otherwise integral unit. This drive axle is made in part or in its entirety of electrically conductive metal. As this part is secured to the rotor, the coil patterns on the both surfaces of the rotor are coupled together electrically. This permits the use of synthetic resin blades in an electromagnetically driven shutter and retains the advantages of using this material.

We claim:

1. An electromagnetic drive device for a camera comprising:
    (a) shutter blades made of synthetic resin, said shutter blades having axle bores formed therein;
    (b) a shutter drive rotor having coil patterns arranged on opposite surfaces thereof, said rotor having axle bores formed therein;
    (c) drive axles for drivingly connecting said rotor with said shutter blades, said drive axles being electrically conductive and fixed at respective ends thereof in said respective rotor axle bores to enable the coil pattern on one surface of said rotor to couple electrically with the coil pattern on the opposite surface thereof, the opposite ends of said drive axles being received in said respective shutter blade axle bores; and
    (d) permanent magnets arranged to apply a magnetic field to said coil patterns, said magnetic field and said coil patterns producing an electromagnetic force that moves said rotor, thereby controlling the operation of the shutter blades.

2. An electromagnetic drive device for a camera comprising:
    (a) a plurality of shutter blades made of synthetic resin, one of said plurality of shutter blades having an axle bore formed therein, the other of said blades having drive axles protruding therefrom and integrally formed with said respective shutter blades;
    (b) a shutter drive rotor having electrically conductive coil patterns arranged on opposite surfaces thereof, said rotor having axle bores formed therein corresponding in number to the number of shutter blades, all of said bores except one receiving said protruding axles;
    (c) a drive axle for drivingly connecting said rotor with said plurality of shutter blades, said drive axle being electrically conductive and fixed at one end thereof to one of said rotor axle bores to electrically couple the coil pattern on one surface of the rotor with the coil pattern on the opposite surface thereof, the opposite end of said drive axle being received in the shutter blade axle bore; and (d) permanent magnets establishing a magnetic field for said coil patterns, said magnetic field and said coil patterns producing an electromagnetic force that drives the rotor, thereby controlling the operation of the shutter blades.

3. A device according to claim 2, wherein said drive axle further comprises only one electrically conductive end portion.

* * * * *